United States Patent [19]
Reime

[11] 3,927,728
[45] Dec. 23, 1975

[54] SUSPENSION SYSTEM FOR ELECTRICALLY POWERED VEHICLE

[75] Inventor: Roy O. Reime, San Jose, Calif.

[73] Assignee: Richard Dorst, Atherton, Calif.

[22] Filed: Oct. 3, 1973

[21] Appl. No.: 403,131

Related U.S. Application Data

[63] Continuation-in-part of Ser. No. 157,132, June 28, 1971, abandoned.

[52] U.S. Cl. .................... 180/60; 180/65; 180/68.5
[51] Int. Cl.² .......................................... B60K 11/18
[58] Field of Search ........ 180/11, 65 R, 65 A, 65 F, 180/60, 59, 58, 57, 56, 55, 54 F, 61, 62, 63, 64 L, 64 M; 318/139, 137, 258, 259, 261, 262, 269, 273, 274, 376; 320/61

[56] References Cited
UNITED STATES PATENTS

| | | | |
|---|---|---|---|
| 636,965 | 11/1899 | Entz | 180/60 |
| 650,893 | 6/1900 | Buffington | 180/68.5 UX |
| 1,112,321 | 9/1914 | Queeney | 180/68.5 |
| 1,423,090 | 7/1922 | Delano | 180/65 R UX |
| 3,630,304 | 12/1971 | Sahinkaya | 318/376 X |

FOREIGN PATENTS OR APPLICATIONS

| | | | |
|---|---|---|---|
| 11,049 | 1894 | United Kingdom | 180/60 |

*Primary Examiner*—Leo Friaglia
*Assistant Examiner*—Milton L. Smith
*Attorney, Agent, or Firm*—Townsend and Townsend

[57] ABSTRACT

An electrically powered road vehicle which has a first main frame that rigidly mounts traction wheels for the vehicle including electric storage batteries and electric drive motors so that a major portion of the total vehicle weight is carried by the main frame and constitutes unsprung weight. A vehicle body which defines the passenger compartment has a first end pivotally connected to a forward end of the main frame and a second end resiliently supported on the main frame by springs disposed adjacent the aft end of the main frame. During operation of the car the motors can be operated in their generator mode and a major portion of kinetic energy released during deceleration of the car is instantaneously converted into electric energy since the deceleration of the unsprung weight is not subject to a phase shift in the deceleration so that the operation of the motors can be continuously alternated between a motor mode operation and a generator mode operation for maximum efficiency. Also disclosed is a mounting of shock sensitive components in a semi-rigid manner in which such components are free to oscillate vertically but in which they are rigidly secured against movement in a horizontal plane so that for purposes of energy regeneration such components also lack phase shift.

8 Claims, 4 Drawing Figures

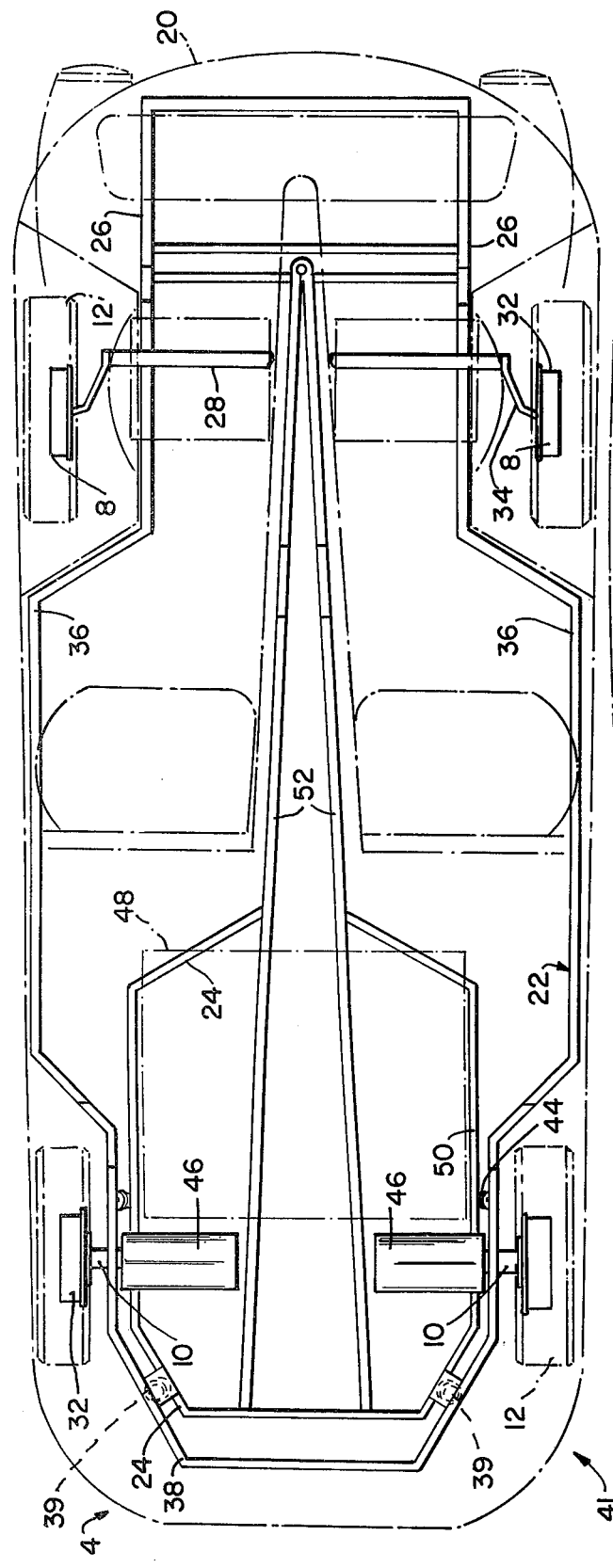
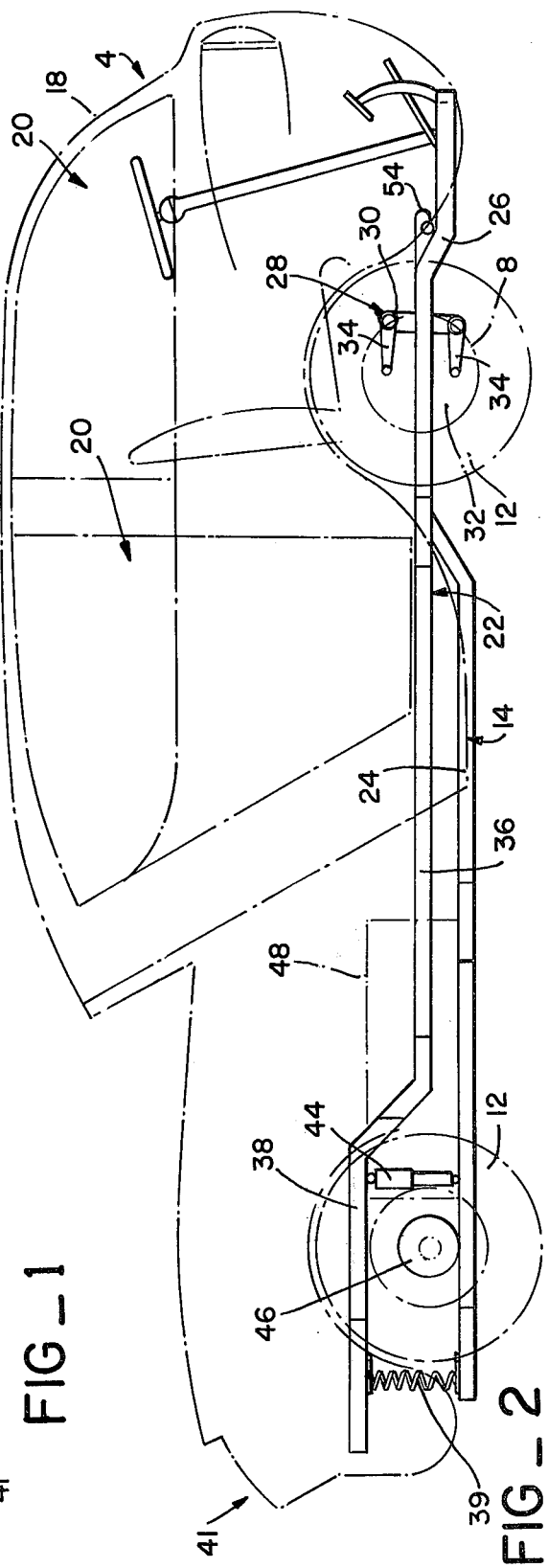
FIG_1
FIG_2

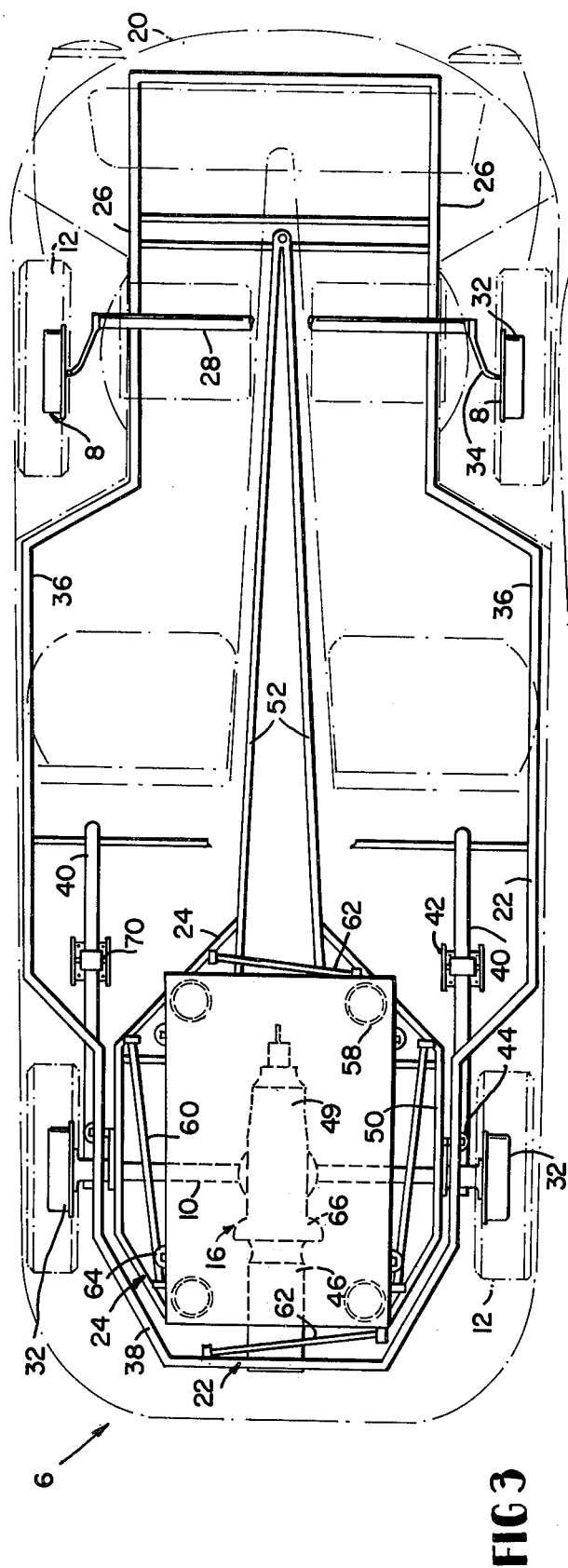

3,927,728

SUSPENSION SYSTEM FOR ELECTRICALLY POWERED VEHICLE

RELATED APPLICATIONS

This application is a continuation-in-part application of copending parent application, Ser. No. 157,132, filed June 28, 1971, for "VEHICLE SUSPENSION SYSTEM" now abandoned.

BACKGROUND OF THE INVENTION

Conventional vehicles comprise a frame to which two or more axles mounting running wheels are secured and on which a vehicle body defining a passenger compartment is built. A drive mechanism such as an internal combustion engine or an electric propulsion system is suspended from the frame and coupled with the drive wheels of the vehicle via a drive shaft. For passenger comfort, the frame is connected to the axles with springs to isolate wheel vibrations and shock.

During operation of the vehicle through turns the frame sways and tilts on the springs, thereby causing a load shift between the vehicle wheels which adversely affects the vehicle's driving characteristics and can represent a hazard to the vehicle under adverse road conditions or high speed operation of the vehicle. An appreciable portion of the vehicle's kinetic energy is dissipated in the suspension system. This is undesirable in instances where the kinetic energy is to be recovered for electric power generation or the like.

Electric car propulsion systems are presently under development which employ electric motors for driving traction wheels of the vehicle. Electric energy for the motors is obtained from storage batteries mounted in the vehicle. To eliminate the need for an excessive number of batteries which would greatly increase the dead weight of the vehicle and to eliminate too frequent battery recharges, which would render the vehicle impractical to use, it is necessary to conserve as much energy as possible. One way to conserve such energy is to regenerate kinetic energy of the moving vehicle into electric energy by operating the motor in a generator mode during the vehicle decelerations. Energy conservation has also been obtained by continuously alternating the operation of the motor between its motor mode and its generator mode at relatively high and variable rates of as much as 400 cycles per second.

Under such conditions, it is of course necessary that there be no phase shift between motor operating mode shifts and the mass decelerations of the vehicle. Such phase shifts are possible, however, for those portions of the vehicle mass which are not directly coupled to the traction wheel and, thereby, the electric motors, but which are "sprung" since sprung weight is resiliently mounted and inherently permits relative movement. Although in terms of electricity regeneration this might be of little significance in certain instances, such as prolonged braking to slow down and stop the vehicle in which the generator mode operation of the motors is continuous and takes place over an extended period of time, it is of great significance when the motors are rapidly alternated between their motor and their generator modes. Even minute phase shifts might eliminate a large proportion of the vehicle mass from contributing to the regeneration of electric energy thereby defeating the purpose and benefits of relatively high frequency shifts between motor and generator mode operation of the vehicle motors.

Swaying and tilting and phase shifts can be reduced by stiffening the springs. This, however, transmits a greater proportion of the wheel shock and vibration to the passenger compartment and reduces passenger comfort. Moreover, even if swaying and tilting is reduced to acceptable levels, phase shifting still occurs.

In addition, the conventional, single frame suspension systems require elaborate tools and equipment and great amounts of labor just to gain access to the drive mechanism for the vehicle for service and repairs. This substantially contributes to today's high cost of maintaining automobiles.

Summary of the Invention

The present invention provides a two-part vehicle suspension in which the relatively light weight vehicle body and passenger compartment remain isolated from wheel shock and vibrations while the relatively much heavier drive mechanism and components of the vehicle are non-resiliently connected to the drive wheels of the vehicle and thereby the electric motors of the vehicle. The non-resiliently or rigidly mounted portions of the vehicle comprise "unsprung" weight which is instantaneously available for regenerating kinetic vehicle energy into electric energy when the motors are operated in their generator mode since such weight is not subject to the earlier discussed "phase shift". Moreover, the unsprung weight portion of the vehicle increases drive wheel traction and reduces swaying and tilting of a large portion of the vehicle's mass, thus enhancing the drive characteristics of the vehicle.

Briefly, an electrically powered vehicle or car constructed in accordance with the present invention comprises a main horizontal frame, traction wheels and at least one associated electric motor and at least one associated electric storage battery all of which are rigidly mounted to and carried by the main frame. A passenger body frame is pivotally mounted to a forward end of the main frame and aft of the main frame.

The main or motor frame mounts the heavy components such as the electric motor or motors, associated drive components and the electric storage batteries stiffly or rigidly to the drive axle of the vehicle. In this context, the terms "stiffly" or "rigidly" mean the non-resilient mounting of such components without interposing springs or by interposing springs which under a given force deflect substantially less than conventional resilient mounting means for the body frame would deflect. In one embodiment of the invention means is further provided for protecting shock or vibration sensitive vehicle components by permitting such components to resiliently move in a vertical direction only while preventing them to move in a horizontal direction. Thus while such components are isolated from shock they remain in phase with the motor-generator during cyclical accelerations and decelerations induced by cyclically alternating the operation of the motors in their motor and generator modes.

A vehicle constructed as above described has an unsprung weight substantially greater than the sprung weight represented by the vehicle body and components mounted thereto. Consequently, a major portion of the vehicle weight does not exhibit a phase shift during the operation of the motors in their motor and generator modes to thereby obtain maximum energy recoveries while the motor operates in its generator mode and thus conserve energy and to thereby operate the vehicle in the most efficient manner.

The motor frame is movably, e.g. pivotally mounted to a portion of the body frame adjacent the steering wheel of the vehicle to transfer a predetermined proportion of the weight of motor frame mounted components to the other axle. By moving the relative position of the connection point with respect to the other axle, the proportion of the weight transferred to the other axle can be adjusted and the weight carried by all wheels can be substantially equalized to minimize frictional losses due to uneven tire deflection. Moreover, the connection is of the type that is readily severed, such as a ball joint. By providing means for readily disconnecting the resilient mounting means from the body frame, the drive axle, the motor frame and the propulsion system components mounted to the motor frame can be disconnected from the body frame and the vehicle body and moved away therefrom. Ready access to the vehicle drive mechanism, its motor, gears, etc., is thus provided without the need for expending large amounts of time to do so. Vehicle repair and maintenance costs can thereby be substantially reduced.

In addition to the above stated advantages mounting a substantial portion of the vehicle mass rigidly prevents a dispersion of kinetic energy in the mounting springs. It is thus possible to transform a substantially greater proportion of the kinetic energy of the vehicle into electrical energy than was possible with prior art vehicles in which almost the full weight of the vehicle was sprung. This could result in often sizable energy losses due to temperature rises in the springs, displacement of hydraulic fluids and oscillation of the vehicle on the springs.

The main frame mounting the heavy components of the vehicle is disposed beneath the body and enables the mounting of the "unsprung" components as low as possible to thereby lower the center of gravity of the vehicle and enhance the drive characteristics of the vehicle. The heaviest components such as the storage batteries and the motors can at least in part be mounted beneath the axes of the vehicle so that movements about the steering wheel axis during deceleration or braking are eliminated to further enhance the efficiency with which the vehicle is operated.

BRIEF DESCRIPTION OF THE DRAWINGS

FIG. 1 is a fragmentary bottom view of the vehicle suspension system of the present invention and illustrates the outline of the body frame in phantom lines;

FIG. 2 is a side elevational view of the suspension system illustrated in FIG. 1;

FIG. 3 is a fragmentary bottom view similar to FIG. 1 of another embodiment of the vehicle suspension system of the present invention and also illustrates the outline of a body frame in phantom lines; and FIG. 4 is a side elevational view of the suspension system illustrated in FIG. 3.

DESCRIPTION OF THE PREFERRED EMBODIMENTS

Referring to FIGS. 1 and 2, a vehicle such as a passenger automobile 4 generally comprises forward and aft axles 8 and 10, respectively, mounting running wheels 12, a frame unit 14, a drive or propulsion mechanism 16 and a body 18 which defines a passenger compartment 20. In accordance with the present invention frame unit 14 is constructed in two parts, a body frame 22 and a main or motor frame 24 which suspend body 18 and drive mechanism 16, respectively, for maximum passenger comfort and best vehicle drive characteristics.

Body frame 22 extends over substantially the full length of the automobile and includes a forward portion 26 disposed beneath the driver's seat of the vehicle and suspended from front axle 8 via torsion bar spring arrangements 28 housed in tubular members 30 and connected to drums 32 of the wheels via rearwardly extending arms 34. Other suitable spring suspension systems can of course be substituted.

A center portion 36 of the body frame extends laterally outward to adjacent sides of body 18 and an aft end 38 extends upwardly a substantial distance above aft axle 10 and permits relative vertical movements between the body frame and the aft axle. A spring arrangement such as a coil spring 39 disposed between the motor frame and the body frame adjacent an aft end 41 of the vehicle resiliently supports the body frame on and above the motor frame. Shock absorbers 44 are also provided to dampen the relative oscillations between the rear axle and the body frame in a well known manner.

Automobile body 18 is conventionally attached to the body frame and is carried thereby during all times. Springs 28 and 39 are so selected and constructed that vibrations of wheels 12 during operation of the automobile are largely dissipated in the springs and not transmitted to the body and the passenger compartment to assure a soft and comfortable ride. This allows the body frame to sway sideways during operation, particularly when the vehicle is operated through a turn, but does not influence the drive characteristics of the vehicle significantly since the body frame and the body mounted thereon are relatively light weight. Consequently, there is a relatively insignificant load shift among the automobile wheels during such turning maneuvers so that the stability of the automobile is not appreciably effected.

The heavy components of the automobile, such as an electric motor 46 for each aft or traction wheel 12, electric storage batteries 48, and the necessary drive components such as the driven wheels are stiffly mounted to the frame. This assures high wheel traction and prevents all components connected to the motor frame from swaying or surging during drive maneuvers, acceleration or deceleration. Accordingly the frame and the components connected thereon are in phase with the motor when the motor cyclically alternates between its motor and its generator operating modes.

During operation of the motors in their motor modes they are supplied with electric current and drive the wheels as is described below. During operation in their generator modes they are driven by the wheels and generate electric current which is returned to the storage battery via suitable controls. During the motor mode the motors briefly accelerate the drive wheels while during their operation in the generator mode they briefly decelerate the drive wheels and the vehicle, thereby converting kinetic energy of the vehicle into electric energy for storage in the batteries. The motors alternate cyclically between their two operating modes and one or the other mode can be prolonged or shortened to provide more or less power to the traction wheels.

In the presently preferred embodiment of the invention illustrated in FIGS. 1 and 2, a separate motor 46 is rigidly secured to a mounting section 50 of motor frame 24 and directly coupled to each aft wheel 12. The motor frame includes a forwardly extending A-frame 52 which is movably, e.g. pivotally secured to the body frame adjacent and forward of the vehicle axle 8. A universally movable ball joint 54 or a hinge connection permitting the frame to pivot at least about a horizontal axis perpendicular to the longitudinal axis of the vehicle can be employed.

Electric storage batteries 48 are directly mounted to mounting section 50 of the motor frame. A suitable support for the batteries such as a plate (not separately shown) bolted to the mounting section of the frame is provided. It will be noted that the motor frame together with a portion of the drive motors and the storage batteries is disposed beneath both the body frame 22 and the axes 8, 10 of the vehicle to assure a low center of gravity for the earlier mentioned advantages.

In use the suspension system of the present invention, the resilient mount for body 18 and body frame 22, e.g. torsion bar spring arrangement 28 and springs 39, isolate the passenger compartment 20 from shock and vibration of wheels 12 as necessary to provide the desired passenger comfort. When the vehicle is in motion, the body frame and the body mounted thereon behave substantially in the same manner as do prior art automobile body constructions employing a unitary frame for both the body and the drive mechanism. Motor frame 24, on the other hand, and the manner in which drive mechanism 16 is mounted thereto, prevent a swaying or surging of a major portion of the vehicle weight, e.g. the motor, the electric storage batteries, the traction wheels and the motor frame.

The provision of A-frame 52 for connection to the body frame adjacent front axle 8 enables control of the loading of running wheels 12 on the front axle. Ball joint 54 can be moved forward or rearward (not illustrated) of the front axle to achieve the desired weighting of the forward running wheels. Movements of the body frame adjacent the front axle as a result of its sprung connection to the running wheels have a negligible effect on the mounting of the drive system on motor frame 24. Such movements of the body frame ball joint 54 and the forward end of A-frame 52 cause only minute pivotal movements of the drive system 16 components about the axis of rear axle 10 because of the long moment arm provided by the A-frame.

Referring now to FIGS. 3 and 4, another embodiment of the invention is described. It includes a vehicle such as a passenger automobile 6 and generally comprises the same forward and aft axles 8 and 10, respectively, mounting running wheels 12, frame unit 14, drive or propulsion mechanism 16 and body 18 defining passenger compartment 20 as does the vehicle 4 shown in FIGS. 1 and 2. Again, frame unit 14 is constructed in two parts, a body frame 22 and a motor frame 24 which suspend body 18 and drive mechanism 16, respectively, for maximum passenger comfort and best vehicle drive characteristics.

Body frame 22 extends over substantially the full length of the automobile and includes a forward portion 26 disposed beneath the driver's seat of the vehicle and suspended from front axle 8 via torsion bar spring arrangements 28 housed in tubular members 30 and connected to drums 32 of the wheels via rearwardly extending arms 34. A center portion 36 of the body frame extends laterally outward to adjacent sides of body 18 and an aft end 38 extends upwardly a substantial distance above aft axle 10 to permit relative vertical movements between the body frame and the aft axle. A spring arrangement such as a leaf spring 40 anchored to a spring support 42, torsion springs, coil springs or the like (not shown), resiliently mounts the body frame to the aft axle. Shock absorbers 44 are also provided to dampen the relative oscillations between the rear axle and the body frame in a well known manner.

The automobile body 18 is attached to the body frame as above described in FIGS. 1 and 2 except that the coil spring 39 is replaced by leaf spring 40.

The heavy components of the automobile, such as an internal combustion engine (not separately shown) or an electric motor 46, electric storage batteries 48, gears and the like are stiffly mounted to a driven axle, say the aft axle 10 of the automobile. This assures high wheel traction and prevents load shifts from the swaying of relatively resiliently spring mounted components as found on prior art automobiles. Motor frame 24 is employed to mount at least some of the components of drive mechanism 16.

The motor frame is stiffly mounted to aft axle 10 and comprises a mounting section 50 disposed beneath aft end 38 of the body frame, an axle housing 49 connected with the mounting section and a forwardly extending A-frame 52 which is movably, e.g. pivotally secured to the body frame adjacent forward axle 8 by a suitable coupling such as a ball joint 54. The mounting section of the motor frame is directly secured to housing 49, as by welding or bolting it thereto, and is thus rigid therewith and with the drive wheels disposed on each end of the housing.

In contrast to the embodiment of the invention shown in FIGS. 1 and 2 electric storage batteries 48 are placed on a battery support structure 56 that is vertically spaced above mounting section 50 and aft axle 10. Four stiff coil springs 58 suspend the support structure above the mounting section and permit only slight relative movements between the support structure, the motor frame and the aft automobile axle. If desired, instead of the illustrated coil springs, leaf or torsion springs (not shown) or a hydraulic suspension with suitable accumulator tanks (not shown), can be employed. Opposing pairs of stabilizing bars 60 and 62 are pivotally connected to motor frame 24 and support structure 56, and permit relative movements of the support structure in the direction of the axis of coil springs 58, or in a vertical direction, and prevent substantially all lateral or swaying movement of the support structure during the operation of the vehicle as when subjected to centrifugal forces while the automobile drives through a turn. A shifting of the weight of batteries 48 from one to the other one of the aft automobile wheels as a result of swaying or sideway motions of the support structure and the batteries carried thereon is thereby prevented. Shock absorbers 64 are mounted between the battery support structure 56 and motor frame 24 and dampen oscillations of the support structure in a well known manner.

In the embodiment of the invention illustrated in FIGS. 3 and 4 only one electric drive motor 46 is utilized. It is directly mounted to housing 49 by bolting it to a mounting flange 68 of a rearwardly opening bell housing 66.

The suspension system illustrated in FIGS. 3 and 4 is used substantially as described above in connection with the description of the use of the system illustrated in FIGS. 1 and 2.

When components of the drive mechanism 16 need attention for repair, maintenance or inspection, they can be quickly separated from the body of the automobile for easy and direct access. For this purpose, spring support 42 includes a quick release bolt 70 that can be withdrawn to release the spring and thus decouple body frame 22 from aft axle 10. When ball joint 54 is released, body frame 22 and body 18 can be pivoted in a clockwise direction, as viewed in FIG. 2, to raise them above motor frame 24 and battery support structure 56 whereupon the motor frame with drive mechanism 16 can be rolled rearwardly away from the body for direct access during the inspection, maintenance and/or repair work. Complicated operations to merely gain access to the drive mechanism as is the rule with prior art automobile suspension systems and resulting high maintenance and repair costs are thus substantially reduced or eliminated.

I claim:

1. An improved electric car of the type having electric motor means for driving traction wheels of the car, the motor means operating in a continuously alternating motor mode and generator mode for conserving energy, the car comprising a horizontal main frame having forward and aft ends, at least two traction wheels mounted directly to the main frame adjacent its aft end; means rigidly mounting the motor means to the main frame; electric storage batteries operatively coupled to the motor means and rigidly mounted to the main frame; means pivotally securing a passenger compartment to the main frame adjacent the forward end thereof, the pivot means permitting relative pivotal movements of the compartment at least about a horizontal axis which is perpendicular to a longitudinal axis of the car; spring means resiliently supporting a portion of the compartment on the frame and disposed adjacent the aft end of the main frame; and steering wheels for the car mounted adjacent the forward end of the main frame; the combined weight of the main frame and of components rigidly mounted thereto substantially exceeding the weight of the compartment and components spring mounted to the main frame to minimize the surging of spring mounted car weight during driving maneuvers of the car and to facilitate the instantaneous deceleration of unspring weight in phase with the operation of the motor means in their generator mode to thereby maximize the recovery of electric energy from kinetic energy of the car when the car decelerates.

2. A car according to claim 1 wherein the pivot means is in substantial alignment with an axis of the steering wheels.

3. A self-propelled vehicle comprising at least two spaced apart axles for mounting running wheels, a body frame resiliently secured to one of the axles, means demountably and resiliently connecting the body frame with another one of the axles, a motor frame substantially rigidly connected to the other axle for mounting components of a vehicle drive system, electric motor means fixed directly to the other frame at the other axle, means mounting the battery above the other axle, means semi-rigidly mounting the battery to the motor frame, positioning the battery above the axle and permitting only minor relative movements between the battery and the motor frame in a vertical direction only, and means mounting the rigid frame adjacent the one axle, the body frame and the rigid frame being constructed so that upon release of the connection means between the body frame and the other axle and of the mounting means between the body frame and the rigid frame the rigid frame having the electric motor means and battery means thereon can be rolled on the wheels of the other axle away from the body frame to facilitate access to the driving system for repair and maintenance.

4. A suspension for a self-propelled vehicle for providing relatively high traction forces between a driven vehicle wheel and a supporting surface, preventing excessive vehicle sway from relatively large shifting loads during the operation of the vehicle, and for providing a relatively shock and vibration free ride for vehicle passengers, the suspension system comprising:

first and second axle assemblies including running wheels mounted thereto, a first frame disposed between the axles and mounting a vehicle body defining a passenger compartment, means resiliently mounting the first frame to the axles for substantially reducing wheel shock and vibrations in the passenger compartment, a second frame rigidly mounted to the first axle and having a portion extending towards the second axle, means pivotally movably connecting an end of the second frame portion to the first frame for permitting relative movements between the first and second frames adjacent the second axle, means for mounting at least part of relatively heavy electric motor components of a drive system for the wheels of the first axle substantially rigidly to the second frame for subjecting the first axle to a major portion of the weight of the drive system components and preventing relatively large load shifting between wheels from lateral movements and tilting of the drive system components during operating maneuvers of the vehicle to thereby substantially enhance the operating characteristics and stability of the vehicle;

electric battery mounting means disposed above the first axle and second frame;

means pivotally connected to the second frame and the battery mounting means and permitting relative movements between the second frame and the battery mounting means in a vertical direction only, and means limiting the magnitude of the vertical movements between the second frame and the battery mounting means to relatively minor movements.

5. A vehicle suspension according to claim 4 including shock absorption means between the battery mounting means and the second frame for dampening relative vertical movements of the battery mounting means.

6. A vehicle suspension according to claim 4 wherein the resilient first frame mounting means comprises relatively soft spring means permitting relative vertical motions and sideway tilting between the first frame and the axles.

7. A road vehicle comprising a motor rigidly attached to a vehicle drive axle housing a component mounting frame semi-rigidly attached to the axle housing, said component mounting frame having relatively fragile propulsion system components attached thereto, means confining the component mounting frame to substantially vertical motion with respect to the axle housing, a motor frame rigidly attached to the motor, extending away therefrom and terminating in a free end, body mounting means resiliently connecting a vehicle body to the vehicle drive axle housing, the body mounting means further pivotally connecting the vehicle body to the motor frame permitting relative pivotal movements between them about a horizontal axis disposed adjacent a second axle spaced from said axle housing, whereby the motor is rigidly attached to the vehicle drive axle housing to increase traction of the drive wheels and prevent swaying of said motor during operation of the road vehicle, the relatively fragile propulsion system components being semi-rigidly attached to the vehicle drive axle housing to inhibit damage to said components but to prevent substantial swaying of said components during operation of said vehicle, and the body being resiliently mounted to the vehicle drive axle housing to provide a smooth ride for the vehicle occupants.

8. An improved electric car of the type having electric motor means for driving traction wheels of the car, the motor means operating in a continuously alternating motor mode and generator mode for conserving energy, comprising a horizontal main frame having forward and aft ends, at least two traction wheels mounted directly to the main frame adjacent its aft end; means rigidly mounting the motor means to the main frame; electric storage batteries operatively coupled to the motor means and rigidly mounted to the main frame, at least a portion of the storage batteries being positioned beneath an axle of said traction wheels; means pivotally securing a passenger compartment to the main frame adjacent the forward end thereof, the pivot means permitting relative pivotal movements of the compartment at least about a horizontal axis which is perpendicular to a longitudinal axis of the car; spring means resiliently supporting a portion of the compartment on the frame and disposed adjacent the aft end of the main frame; and steering wheels for the car mounted adjacent the forward end of the main frame; the combined weight of the main frame and of components rigidly mounted thereto substantially exceeding the weight of the compartment and components spring mounted to the main frame to minimize the surging of spring mounted car weight during driving maneuvers of the car and to facilitate the instantaneous deceleration of unsprung weight in phase with the operation of the motor means in their generator mode to thereby maximize the recovery of electric energy from kinetic energy of the car when the car decelerates.

* * * * *